United States Patent [19]
Ziegler et al.

[11] Patent Number: 6,044,677
[45] Date of Patent: Apr. 4, 2000

[54] METHOD FOR SURFACE STRUCTURING, AND A SURFACE-STRUCTURED WORKPIECE

[75] Inventors: Lars Ziegler, Leonberg; Thomas Keicher; Peter Elsner, both of Pfinztal; Peter Eyerer, Karlsruhe; Volker Komanschek, Wannweil, all of Germany

[73] Assignee: Fraunhofer-Gesellschaft zur Foerderung der Angewandten Forschung E.V., Munich, Germany

[21] Appl. No.: 09/253,068

[22] Filed: Feb. 19, 1999

[30] Foreign Application Priority Data

Feb. 19, 1998 [DE] Germany ............ 198 06 870

[51] Int. Cl.⁷ .................................................. B21J 5/04
[52] U.S. Cl. .................................. 72/56; 72/430; 72/706
[58] Field of Search ........................... 72/54, 56, 430, 72/706

[56] References Cited

U.S. PATENT DOCUMENTS

| | | | |
|---|---|---|---|
| 3,050,850 | 8/1962 | Chapman ................................. | 72/56 |
| 3,060,879 | 10/1962 | Staba ........................................ | 72/56 |
| 3,451,239 | 6/1969 | Riegelmayer et al. .................. | 72/56 |

FOREIGN PATENT DOCUMENTS

| | | | |
|---|---|---|---|
| 12398829 | 7/1960 | France ..................................... | 72/56 |
| 6905782 | 10/1970 | Netherlands ............................. | 72/56 |
| 105422 | 9/1942 | Sweden ................................... | 72/706 |

OTHER PUBLICATIONS

Werkzeugbau fur die Kunststoff–Verarbeitung, Dr. –Ing. Klaus Stoeckhert, 3rd Edition, Carl Hanser Verlag, pp 392–402.

Menges et al., Anleitung zum Bau von SpritzgieBwerkzeugen, 3rd Edition, Carl Hanser Verlag, pp 50–70.

Metallbearbeitung durch Explosionsenergie, (1964), pp 171–175.

*Primary Examiner*—David Jones
*Attorney, Agent, or Firm*—Foley & Lardner

[57] ABSTRACT

The present invention relates to a method for surface structuring of workpieces, in particular molds for plastics processing, erosion electrodes or the like, in which a structured surface is applied to an unstructured workpiece surface in order to map the structure into the workpiece surface. In order to provide a method which can be carried out more quickly, and which involves no environmentally hazardous process steps, it is proposed that a structure layer which has the structured surface is arranged between an explosive layer and the workpiece surface, and the structure is forced into the workpiece surface by detonating the explosive layer or a surface-structured explosive layer is arranged on a workpiece surface, and the structure is embossed onto the workpiece by detonating the explosive layer. The invention furthermore relates to a workpiece produced using this method, such a an injection-molding mold, a blowing mold, a compression mold, a foaming mold and a pressure-casting mold, erosion electrode or the like, in which the structure is forced into the workpiece surface by means of an explosive layer.

9 Claims, 1 Drawing Sheet

METHOD FOR SURFACE STRUCTURING, AND A SURFACE-STRUCTURED WORKPIECE

BACKGROUND OF THE INVENTION

1. Field of the Invention

The invention relates to a method for surface texturing of workpieces, such as molds for plastics processing or erosion electrodes for producing molds, and to a workpiece.

2. Description of Related Art

In order that plastic molded parts have a decorative appearance and/or do not show scratches, they often have a textured surface. The advantages of texturing are not only esthetic. Minor surface flaws which can occur in the molding process are hidden by the texture. Surface texturing can be carried out not only on injection-molded parts, but on virtually any part produced by a molding process.

Suitable tools for plastics processing for producing such molded parts are, for example, injection-molding molds, blowing molds, compression molds, vacuum molds, foaming molds and pressure-casting molds. In order to form the molded parts with a textured surface, the texture must first of all be mapped as a negative pattern onto the corresponding surface of the tool. In addition to blasting techniques, galvanization, photochemical etching and electrochemical dissolving are known in order to map the structure into the tool surface. These methods are described, for example, in "Werkzeugbau für die Kunststoff-Verarbeitung" [Tool construction for plastics processing], Dr.-Ing. Klaus Stoeckhert, $3^{rd}$ Edition, Carl Hanser Verlag, pages 392 to 402 and in "Anleitung zum Bau von Spritzgießwerkzeugen" [Instructions for constructing injection-modling mods], Georg Menges, Paul Mohren, $3^{rd}$ Edition, Carl Hanser Verlag, pages 50 to 70.

All the above methods have at least the disadvantage that they are highly complex, tedious and costly. A further disadvantage is that the known methods are environmentally damaging and, in such cases, may no longer be carried out, for example, in Germany due to strict environmental regulations. The necessary transport of products made by these method from other countries represents a further impact on the environment.

For example, photochemical etching also has the further disadvantages that multistage designs can be produced only by repeating the etching process a number of times. Leather grains, for example, cannot be reproduced realistically in the desired manner. Furthermore, the etched structures frequently have sharp edges, so that subsequent blasting with a suitable material, for example glass balls, is required. This requires considerable experience in order to obtain satisfactory results from the etching process. A further disadvantage of this method is that it requires a homogeneous structure and homogeneous hardness of the material to be processed.

The facilities for the process of electrochemical machining (ECM) are very expensive and are therefore suitable only for large batches of workpieces with the same geometry. It is also disadvantageous that the process requires a considerable amount of know-how.

SUMMARY OF THE INVENTION

Based on the known methods and processes and workpieces produced using them, an object of the invention was to specify an improved method which avoids the above-mentioned disadvantages, as well as to provide a workpiece produced using this method.

In accordance with these and other objects, there is provided a method for surface texturing of workpieces comprising: applying a textured surface to an unstructured workpiece surface, mapping the texture into the workpiece surface, arranging a texture layer which has the textured surface between an explosive layer and the workpiece surface, and forcing the texture into the workpiece surface by detonating the explosive layer.

In further accordance with these and other objects, there is provided a workpiece for plastics processing having a textured surface, wherein the texture of the surface is forced into a surface of the workpiece by use of an explosive layer.

Additional objects, features and advantages of the invention will be set forth in the description which follows, and in part will be obvious from the description, or may be learned by practice of the invention. The objects, features and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

The invention is explained in detail in the following text using exemplary embodiments and with reference to the drawings, in which.

DETAILED DESCRIPTION OF A PREFERRED EMBODIMENT

Figure 1:
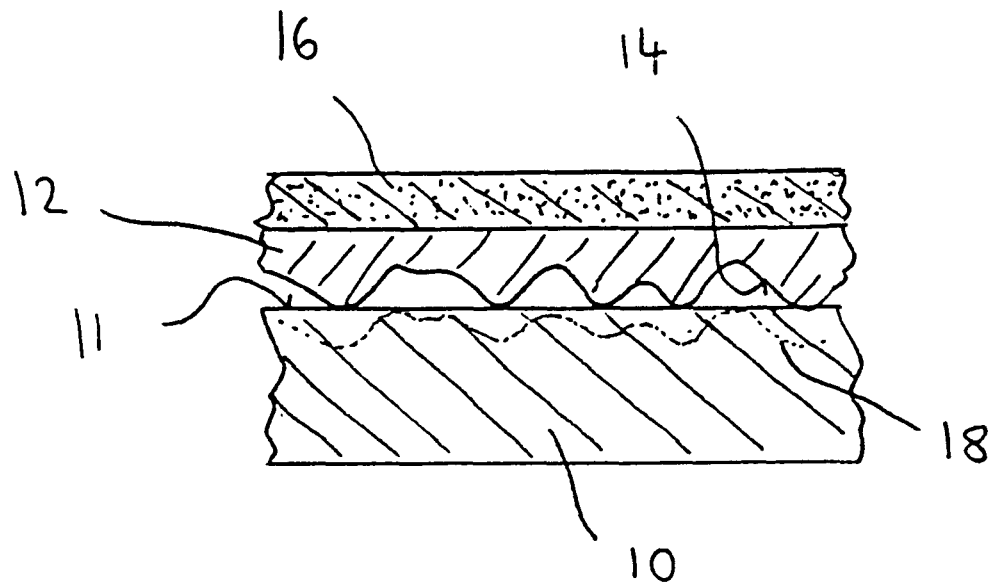
FIG. 1 shows a workpiece to be processed, with a texture layer and explosive layer applied to it.

According to the invention, the texture to be mapped into the workpiece is preferably incorporated in a workpiece surface by detonation, for which purpose either a texture layer having the textured surface can be arranged for example between an explosive layer and the workpiece surface, and the texture can be forced into the workpiece surface by detonating the explosive layer. Alternatively, a surface-textured explosive layer can be arranged on a workpiece surface and the texture is transferred to and embossed onto the workpiece by detonating the explosive layer. The process of detonating explosives results in a high detonation pressure with a rapid pressure rise, as a result of which the texture is stamped into the workpiece. As used herein, "structure" and "structured" are used with "texture" and textured "respectively."

This novel method can generally be carried out without the use of environmentally hazardous chemical substances which are often required in the methods and processes according to the prior art. There is typically no need for any electrochemical or etching process steps. The present process can be carried out considerably more quickly and thus offers shortened production times for the tools produced using the method according to the invention. Detonating the explosive layer over the workpiece surface also results in the workpiece material being compressed, thus resulting in longer tool lives. The method is generally independent of the homogeneity of the structure and the hardness of the tool material.

The method according to the invention can be used particularly advantageously where the materials of the workpiece to be processed are difficult to etch.

Textures such as a leather grain can be mapped into the workpiece surface considerably more realistically. A further major advantage is that so-called free-form surfaces (that is to say, surfaces which cannot be described geometrically and therefore involve major complexity for processing by machine) can be structured just as easily as geometric surfaces.

By selecting the materials used and the amounts of explosive used, the method according to the invention allows textures with sharp edges to be avoided. In most cases, there is generally no need to rework the structure after detonation.

If at least one texture layer which has the textured surface is inserted between the explosive layer and the workpiece surface, a negative pattern of the texture can be obtained on the workpiece surface. This method is thus advantageous for texturing molds which once again transfer the texture to the molded part, which then has the positive pattern of the texture. The texture layer may be any desired layer of a material whose texture is intended to be stamped into the workpiece. Possible texture layers include, for example, leather, synthetic leather, a natural material such as a fallen leaf or some other plant leaf, a fabric or some other decorative material. In this embodiment, the method can be carried out extremely easily since all that has to be done is to place the texture layer and the explosive layer on the workpiece, and to detonate the explosive.

The texture layer should preferably be as thin as possible in order that only a thin explosive layer, consuming a correspondingly small amount of explosive, is required to force the texture into the workpiece surface, in which case the amount of explosive per unit area is, of course, dependent on the material of the workpiece to be processed. It has been found that the thinner the texture layer the greater is the contrast in the texture embossed onto the workpiece.

If the explosive has a high detonation velocity, the texture to be forced in is forced into the workpiece surface virtually everywhere simultaneously, so that the detonation pressure during detonation is essentially the same over the entire surface at any given time, and the texture is not forced into the workpiece surface in a distorted manner. In consequence, a clear pattern of the structure is obtained, and a high level of process reliability is ensured.

In order to influence the detonation pressure in a specific manner, at least one intermediate layer can optionally be provided if desired for any reason, in a refinement of the invention, between the workpiece surface and the textured layer and/or between the texture layer and the explosive layer. For example, by inserting an essentially flat or flat intermediate layer, the detonation pressure is dampened, and sharp edges in the stamped-in texture are thus minimized or avoided. On the one hand, the inclusion of an intermediate layer can produce desired visual effects, and on the other hand there may no longer be any need for reworking of the forced-in texture. The intermediate layer or layers may be formed of any desired material or by air. If the intermediate layer(s) comprises air, the structure layer and the workpiece surface and/or the explosive layer are then just kept at a distance apart by spacers. Other materials which may be used for the intermediate layers include, for example, water, paper or even a metal sheet. If, for example, an intermediate layer is composed of NaCl, any intermediate residue which may be forced into the workpiece generally can easily be removed by water or other solvents.

If the intermediate layers likewise have texture, one, two or even more superimposed structures can be forced into the workpiece surface. This allows special visual effects to be achieved, or multi-stage designs to be incorporated in the workpiece in one step, that is to say with only one explosion.

In an alternative embodiment of the method according to the invention, a texture which is to be applied to the workpiece surface is applied as a negative pattern to a surface of the explosive layer. The structured surface of the explosive layer is then applied to the workpiece surface and detonated. In this case, there is no need for a separate structure layer. This alternative is advantageous for producing, for example, erosion electrodes for the production of identically structured molds. The erosion electrode then has the positive pattern on it, so that a negative pattern can be formed in the mold by the erosion electrode, and the resultant molded part obtained using this mold has a positive image of the texture.

The texture in this case is preferably transferred to the explosive surface by applying a pasty, liquid or molten explosive to the texture to be mapped, for example a leather layer, with the explosive being hardened by drying or cooling to form an explosive layer, and then being pulled off the texture. This procedure allows the same structure to be mapped repeatedly onto a number of explosive layers in a simple manner.

A workpiece according to the invention, such as a mold for plastics processing, an erosion electrode for mold production or the like, having a textured surface, in which the surface texture is forced into the workpiece surface by use of an explosive layer, can be produced very cheaply and quickly. Furthermore, the desired texture is typically reproduced realistically.

For producing molds, for example, it is advantageous if, the texture is forced into the workpiece (or mold) surface as a negative pattern. For the production of erosion electrodes, it is advantageous if, the texture is forced into the workpiece surface as a positive pattern.

A representative method according to the invention was carried out as follows:

A structure layer 12, in this case 0.5 mm thick natural leather layer 12, was applied to a surface 11, to be processed, of a workpiece 10 which, in a first exemplary embodiment, was composed of steel. The textured surface of the leather is denoted by the reference symbol 14, and is illustrated schematically, not to scale, in FIG. 1. An explosive sheet 16 with a thickness of 0.8 mm to 1.2 mm was placed on the texture layer 12. Such an explosive sheet is commercially available under the name "Resaflex" from Hero Sicherheitsservice GmbH, or can easily be produced from the explosive which can be melted, is generally known by the name "Composition B" and is an RDX/TNT mixture. After this, the explosive sheet 16 was detonated. As a result, the leather 12 is accelerated in the direction of the workpiece 10 so that the texture 14 of the leather 12 is stamped into the workpiece surface 11. The stamped-in texture is indicated by the dotted line 18.

The process parameters of the method according to the invention—these being essentially the thickness of the explosive sheet 16, that is to say the amount of explosive per unit area, the thickness of the texture layer 12 and the performance parameters of the explosive—must be matched to one another and to the material of the workpiece, as well as to the material of the texture layer, by suitable experiments.

In a second exemplary embodiment, a liquid, molten or pasty explosive was applied as a layer to a texture to be transferred, for example leather. The explosive, which has hardened somewhat after some time, and the texture layer are then separated from one another by pulling them apart, so that one surface of the explosive layer has a negative pattern of the texture.

Figure 2:
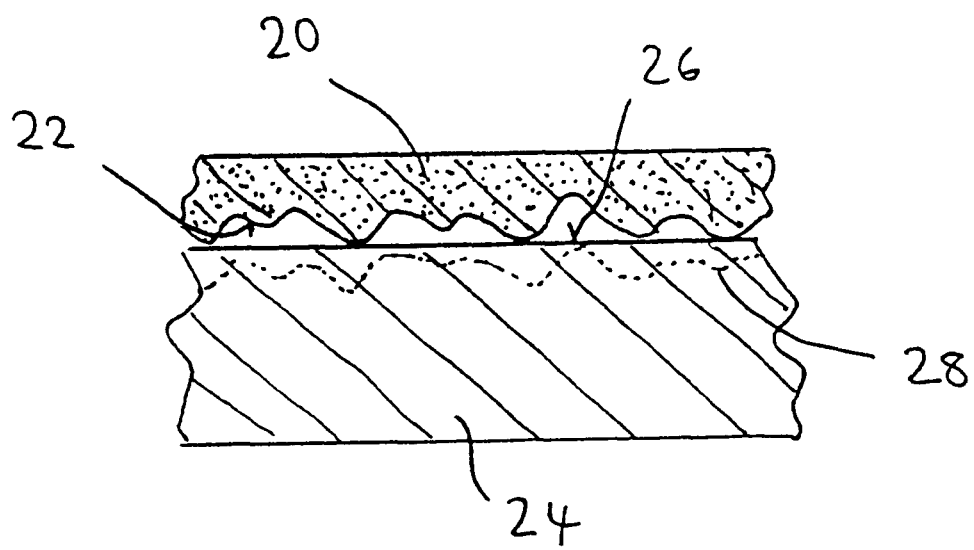
FIG. 2 shows a workpiece to be processed, with a surface-textured explosive layer applied to it.

As shown in FIG. 2, the texture surface 22 of the explosive layer 20 obtained in this way was placed on the workpiece 24 to be processed. The mass distribution of the explosive layer 20 varies corresponding to the texture 22, as does the distance between the explosive layer 20 and the workpiece surface 26. When the explosive layer 20 is detonated, this produced on the workpiece surface 26 a pressure of different intensity corresponding to the profile of the texture 22, so that the texture 22 is stamped into the workpiece 24, and a positive pattern (dotted line 28) of the texture is obtained on the workpiece surface 26.

It would also be conceivable, to first emboss the original texture on, for example, an aluminum foil, and to transfer the texture from the aluminum foil to the explosive layer. The explosive layer then has a positive pattern, and the workpiece is given a negative pattern of the texture when the explosive later applied to the workpiece surface is detonated.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

We claim:

1. A method for texturing one or more surfaces of workpieces comprising:

arranging a textured layer which has a textured surface between an explosive layer and the one or more surfaces of the workpiece, and forcing the texture of the textured surface into the one or more surfaces at the workpiece by detonating the explosive layer.

2. A method as claimed in claim 1, wherein the texture layer is as thin as possible.

3. A method as claimed in claim 1, wherein the explosive has a high detonation velocity.

4. A method as claimed in claim 1, wherein at least one intermediate layer is provided between the workpiece surface and the texture layer and/or between the texture layer and the explosive layer.

5. A method according to claim 1, wherein said workpiece comprises one of a mold for plastics processing, an erosion electrode for mold production or a tool useful as a mold.

6. A method for texturing one or more surfaces of workpieces comprising:

arranging a surface-textured explosive layer on a workpiece surface, and embossing the structure onto the workpiece by detonating the explosive layer.

7. A method as claimed in claim 6, wherein the surface textured explosive layer is formed by applying texture as a negative pattern onto a surface of the explosive layer to form a textured surface.

8. A method as claimed in claim 7, wherein the formation of the surface textured explosive layer further comprises:

applying a pasty, liquid or molten explosive is to the texture, hardening the explosive to form an explosive layer; and pulling the explosive layer off the texture, wherein the explosive layer can then be applied to the workpiece surface.

9. A method according to claim 6, wherein said workpiece comprises one of a mold for plastics processing, an erosion electrode for mold production or a tool useful as a mold.

* * * * *